June 12, 1945. W. J. O'BRIEN 2,378,029
APPARATUS FOR HEAT TREATING LIQUIDS
Filed March 30, 1943 2 Sheets-Sheet 2

William J. O'Brien
INVENTOR.
BY Bodell & Thompson
Attys

Patented June 12, 1945

2,378,029

UNITED STATES PATENT OFFICE 2,378,029

APPARATUS FOR HEAT TREATING LIQUIDS

William J. O'Brien, Syracuse, N. Y.

Application March 30, 1943, Serial No. 481,163

3 Claims. (Cl. 261—75)

This invention has to do with a device for heat treating liquids, particularly in treating liquids by mixing live steam with the liquid during a continuous flow thereof. An example of a use of the device is the heat treatment of raw milk to effect pasteurization thereof preparatory to using the milk for the manufacture of dairy products.

At the present time milk is treated, or pasteurized, by bringing it up to a relatively high temperature while it is confined in a vessel, or the like, by the external application of heat. This is the only satisfactory method of pasteurizing milk intended for general consumption. It can not be pasteurized by direct steam contact in view of the fact that the condensed steam would materially increase the water content of the milk, whereupon it would not contain the required legal butter fat content.

There are however certain instances wherein addition to the water content of the milk does not adversely affect it because during the manufacture of the product, the water content is automatically eliminated from the product. An example of such a product is cheese, the water eventually becoming separated from the other constituents of the milk and drawn off in the form of whey.

Because of the fact that the cost of conventional pasteurizing apparatus is high and the apparatus large and bulky and relatively slow in volume output of milk, most all kinds of cheese are made from raw milk and usually from raw milk of poor grade, with the result that the cheese is unfit for consumption if the cheese is stored. At the present time, a vast amount of cheese is not consumed within a relatively short time after its manufacture, but is transported in foreign shipment and stored for eventual military and civilian use, with the result that large volumes of this cheese shipped to foreign destinations have spoiled before it could be used.

To effect pasteurization of the raw milk, the disadvantages of the conventional pasteurizing apparatus, above alluded to, are not only encountered but, at the present time, it is in fact impossible to obtain such apparatus because it is constructed almost entirely of strategic materials which are not available.

The device of this invention is not only useful to effect pasteurization, as the process is conventionally understood, but it is particularly effective in killing gas forming organisms which is the main cause of poor quality cheese and results in gassy fermentation and spoilage of the cheese. The direct steam contact effected by the device kills thermodonic and thermophilic organisms which are immune to regular and conventional methods of pasteurization. Accordingly, the device is very useful in the pre-treatment of milk which is subsequently pasteurized in the regular manner. When so used, the instantaneous contact of the diffused steam with the milk, for a period not long enough to unduly add to the water content of the milk, is effective to kill such organisms and the various other bacteria that may be contained in the milk is effectively eliminated by subsequent regular pasteurization.

This invention has as an object a device for heat treating or pasteurizing liquids embodying a structure which is particularly economical to construct, which is only a small fractional part of the size of a conventional pasteurizer having the same output, and which employs only a small fractional part of the material which would be required to construct a conventional pasteurizing apparatus for handling a comparable volume of liquid.

The invention has as a further object, a device having the advantages referred to and, at the same time, capable of being completely disassembled, cleaned, and sterilized, and reassembled in a matter of minutes.

The invention consists in the novel features and in the combinations and constructions hereinafter set forth and claimed.

In describing this invention, reference is had to the accompanying drawings in which like characters designate corresponding parts in all the views.

Figure 3 is a plan view of one of the diffusing disks arranged in the device.

Figure 1:
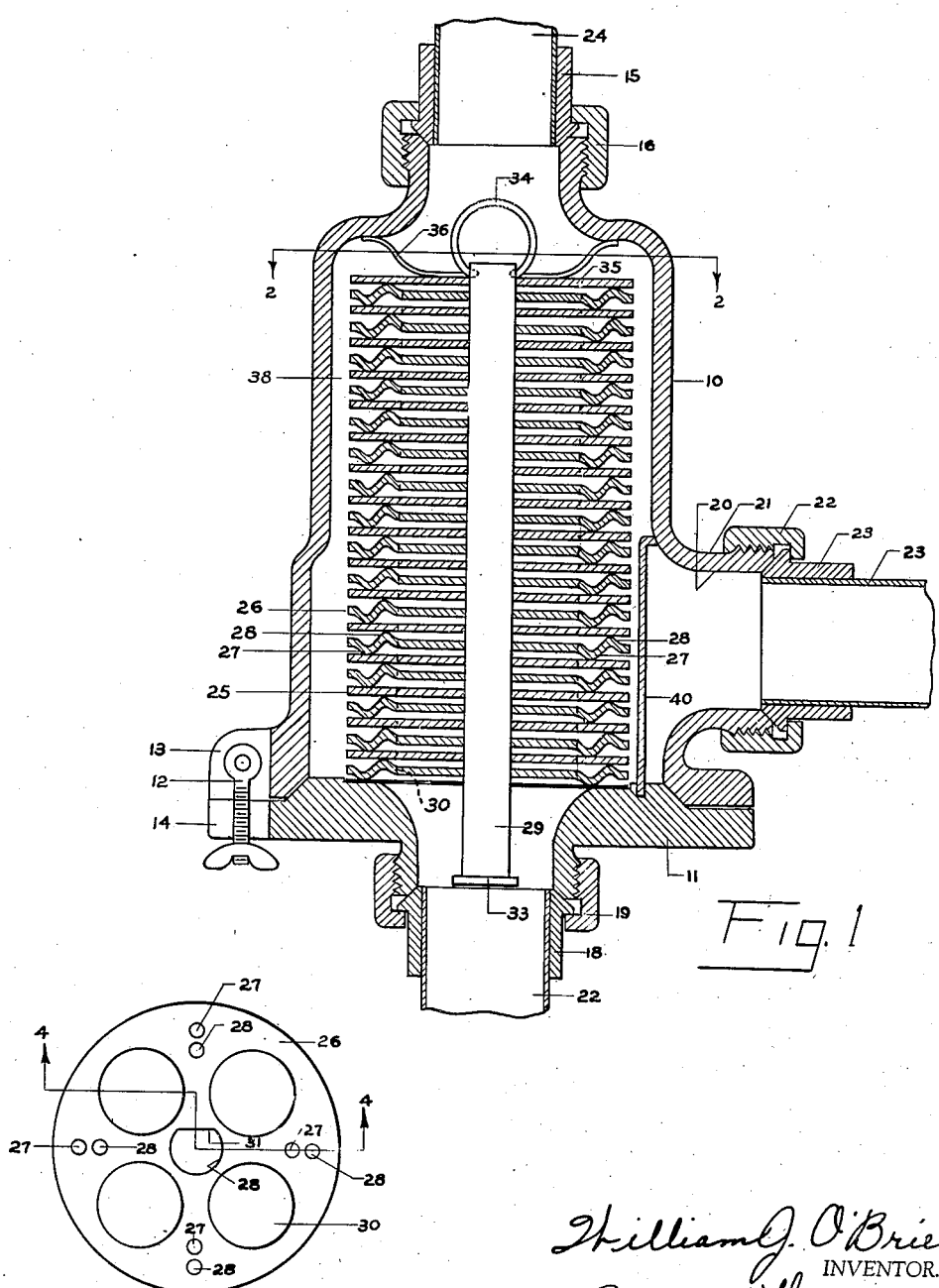
Figure 1 is a vertical sectional view of a device embodying my invention.
Figure 2:
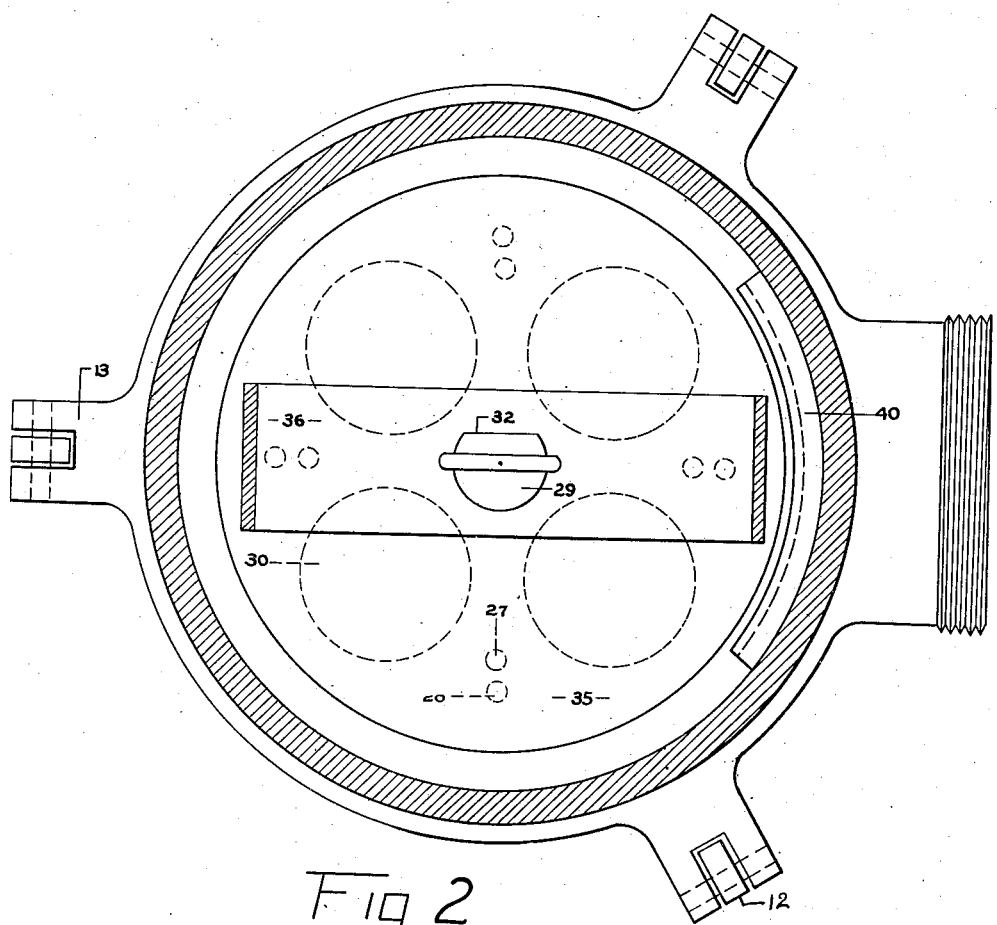
Figure 2 is a transverse sectional view taken on line 2—2, Figure 1.

The device consists of a casing 10 open at its ends. The opening at one end is substantially commensurate with the interior of the casing, and a closure 11 is detachably secured to this end of the casing as by eye-bolts 12 carried by bifurcated lugs 13 extending radially from the casing and cooperating with similar lugs 14 formed on the closure 11, the closure being held in liquid tight engagement with the end of the casing through the instrumentality of a machined or ground joint. The opening in the opposite end of the casing is smaller and arranged to receive a mating pipe coupling member 15 which is detachably secured to the casing in the conventional manner by nut 16 threading onto the end of the casing. The closure 11 is likewise formed to receive the coupling 18 which is detachably secured to the end closure by nut 19.

The casing is also provided with an opening 20 arranged in the side wall adjacent one end of the casing. As shown, the casing is formed with an apertured laterally extending hub 21 also externally threaded to receive nut 22 for pipe coupling 23. Steam is admitted through one end opening, and the treated liquid passes out of the casing through the opposite end opening, the side opening 20 constituting an inlet opening for the liquid being treated. In the arrangement shown, steam under pressure is admitted through the bottom end closure 11 by means of pipe 22. The raw milk is admitted through opening 20 by means of pipe 23, and the treated milk passes out of the casing through pipe 24.

The complete and uniform dispersion of the steam through the liquid is effected by a diffusing element consisting of a plurality of plates arranged in stack formation, the stack formation being positioned in the casing 10 and extending axially thereof. The plates are arranged in spaced apart relation and are formed with apertures which are maintained in register to provide one or more passages extending axially through the stack formation. The plates conform in shape to the cross sectional shape of the casing but of less dimension to provide a space between the periphery of the stack formation and the interior of the casing. Preferably, and as here shown, the casing and stack formation are of circular form, the plates being in the nature of disks formed from thin sheet material.

Figure 4:
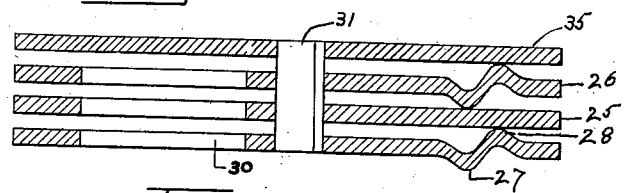
Figure 4 is a sectional view of a portion of the stack formation of disks, the view being taken on line 4—4, Figure 3.

In Figures 1 and 4 the thickness, and particularly the spacing of the plates, are exaggerated in order to more clearly illustrate the structure. In the device in actual use, the plates are in the neighborhood of one-sixteenth of an inch in thickness and are spaced apart in the neighborhood of five thousandths of an inch. This spacing may be effected by any suitable construction. For example, alternate ones of the plates or disks, as 25, may be formed flat, while the intermediate disks, as 26, are formed with slight projections 27 on one side and similar projections 28 on the opposite side. The projections 27, 28 can be economically formed by striking depressions in the plates during the blanking or forming operation.

The plates are slidably mounted upon a retaining member which functions to maintain the disks in stack formation thereto, and also maintain the aperture, or apertures, in the disks in register or alinement, so as to form one or more passages extending axially through the stack formation. As here shown, each plate 25, 26, is formed with a central aperture 28 to receive a pin 29, or like member, for maintaining the disks in stack formation. The disks are also provided with one or more apertures 30, and the pin 29 is cooperable with the disks to maintain the apertures 30 in alinement so as to provide passages extending axially through the stack formation.

As here shown, the central aperture 28 is provided with a flat side 31, and the pin 29 is flattened at one side, as at 32, whereby the plates are retained against relative rotation, but are slidably mounted upon the pin. The pin 29 is of appreciably greater length than the thickness of the stack and is formed at one end with a head 33, and at the opposite end with a snap ring 34. The purpose of this construction is to permit convenient handling of the stack formation and to permit the disks to be separated axially after the stack is removed from the casing, whereby the disks can be conveniently cleaned by brushing, washing, etc. A disk baffle plate 35 is arranged on the top of the stack and is not apertured except centrally to receive the pin 29.

This stack formation of plates is arranged in the casing and supported upon the lower end closure 11, the disks being yieldingly pressed together by a spring 36 positioned on the top baffle disk 35 and coacting with the adjacent end of the casing. The disks are somewhat less in cross sectional dimension than the interior of the casing, whereby a concentric space 38 is provided between the periphery of the stack formation and the interior of the casing.

In operation, the steam passes upwardly through the apertures 30 and laterally between the disks 25, 26, the liquid being treated flowing upwardly through the passage 38, whereby the steam is diffused in the liquid during its travel toward the outlet end of the casing. Preferably, an arcuate baffle 40 is positioned between the casing and the stack formation in proximity to the inlet 20. This baffle assists in directing the milk, or liquid, around the stack formation at the bottom of the casing, and also prevents the live steam from blowing back into the line 23.

It will be apparent that it is only necessary to remove a short section from the milk supply pipe and connect the heat treating device in place of the removed section, the installation requiring only a short period of time and can be effected without any shut-down, or other disturbance, of the dairy operation.

In operation, the device has been found to work quietly and efficiently. It may be quickly and conveniently disconnected from the pipe line and completely disassembled and sterilized in a matter of minutes.

What I claim is:

1. An apparatus for heat treating liquids comprising a casing open at one end, an end closure detachably secured to said end, said casing being formed with a steam inlet in one end and a liquid outlet at the opposite end and having a liquid inlet in the side wall adjacent the steam inlet, a plurality of plates arranged in spaced apart relation in stack formation upon an axially extending retaining member, means for limiting the minimum spacing between said plates, and said plates being separately movable axially along said retaining member, said stack being removable as a unit from the casing and said retaining member having enlarged ends to prevent displacement of the plates when the stack is removed from the casing, each of said plates being formed with an aperture and said retaining member being operable to maintain said plates positioned with their respective apertures in alinement to form a passage extending axially through the stack formation, said stack formation being positioned in the casing and extending from the steam inlet and toward the liquid outlet end and engaging said end closure, spring means cooperable with said stack at the opposite end of the casing and operable to maintain said plates in said minimum spacing.

2. An apparatus for heat treating liquids comprising a cylindrical casing open at one end, said casing being formed with a liquid outlet in the opposite end and a liquid inlet in the side wall adjacent the open end, a closure detachably secured in the open end of the casing and being formed with a steam inlet passage, a plurality of plates arranged in spaced apart relation in a stack formation on a retaining member, said stack formation being positioned centrally in the casing and extending from the steam inlet passage toward the liquid outlet passage and being supported by said end closure, said plates being movable along said retaining member and said member being provided at each end with means to prevent displacement of said plates from said member, said plates being formed with means cooperable to limit the spacing between the plates, and means yieldingly holding said plates in said minimum spaced relation, said stack formation being formed with an aperture extending axially therethrough and an imperforate baffle plate arranged on the end of the stack in proximity to said liquid outlet, and an arcuate removable baffle positioned intermediate the periphery of the stack formation and the interior of the casing in proximity to said liquid inlet.

3. An apparatus for heat treating liquids comprising a casing open at one end and being formed with a liquid outlet passage in its opposite end and with a liquid inlet passage in the side wall adjacent said open end, an end closure detachably secured to the open end of the casing and being formed with a steam inlet passage, a plurality of plates formed with a central aperture and a plurality of openings, a retaining member extending through the central aperture of the plates and maintaining the same in stack formation, said retaining member being slidably mounted in the plates and of greater length than said stack formation and having enlarged ends, whereby the stack may be removed as a unit from the casing and the plates are separately movable axially on said retaining member, said plates having means cooperable to maintain the plates in spaced apart relation in said stack formation and with the openings in the plates in alinement forming passages extending axially through the stack formation, said stack formation being positioned centrally in the casing upon said end closure, and an imperforate plate positioned on the end of the stack formation in proximity to said liquid outlet.

WILLIAM J. O'BRIEN.